Figure 1:
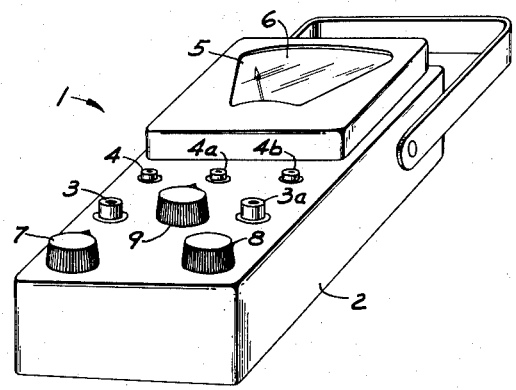

April 16, 1963 R. E. KEMELHOR ETAL 3,086,170
OHMMETER WITH POWER-SOURCE-ISOLATING TRANSDUCERS
FOR TESTING HAZARDOUS OR SENSITIVE CIRCUITS
Filed July 27, 1960 2 Sheets-Sheet 1

EVERAL DONATO
ROBERT E. KEMELHOR
INVENTORS

BY

ATTORNEY

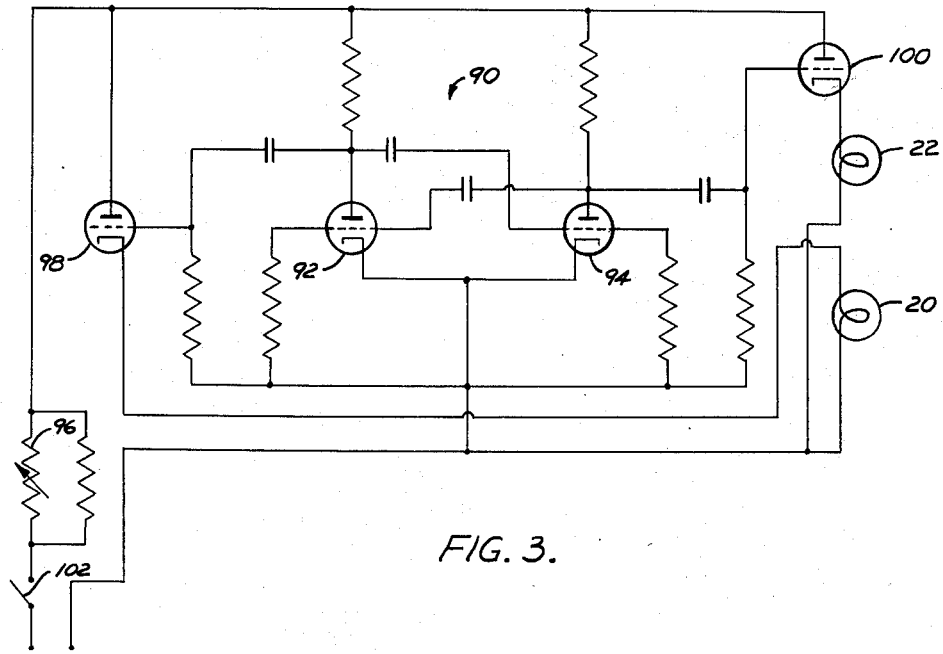
FIG. 3.
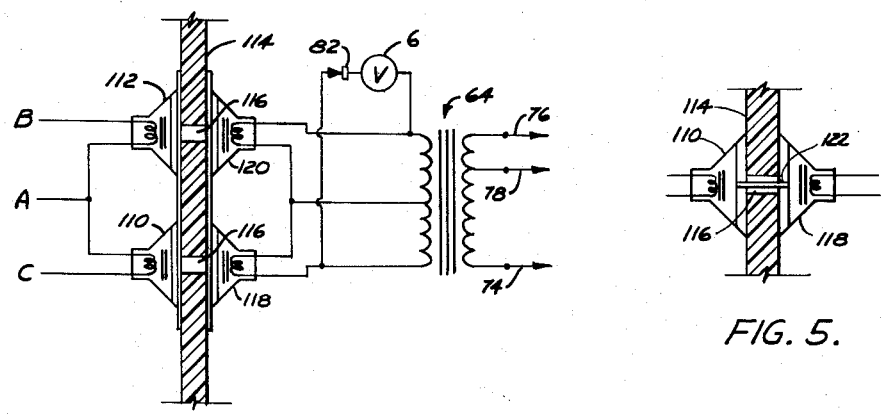
FIG. 4.
FIG. 5.
EVERAL DONATO
ROBERT E. KEMELHOR
INVENTORS
BY
ATTORNEY

United States Patent Office 3,086,170
Patented Apr. 16, 1963

3,086,170
OHMMETER WITH POWER-SOURCE-ISOLATING TRANSDUCERS FOR TESTING HAZARDOUS OR SENSITIVE CIRCUITS
Robert E. Kemelhor, 6211 Redwing Court, Bethesda, Md., and Everal Donato, 3705 Elby, Silver Spring, Md.
Filed July 27, 1960, Ser. No. 45,737
11 Claims. (Cl. 324—62)

This invention relates to an improvement in electrical resistance measuring instruments and more particularly to an improved ohmmeter for measuring the resistance of delicate and sensitive circuits such as meter movements, electrically fired squibs, fuzes and detonators, transistors, sensitive carbon piles, thermocouples, and fractional ampere fuses, without causing damage thereto.

The problem of measuring the extremely low resistances of such sensitive devices as mentioned above without passing too large a current through them has been one of long standing, and the prior art is replete with instruments which are intended for this purpose. These conventional measuring devices generally utilize a Wheatstone bridge, or others may depend on resistance-capacitance circuits or photocells to generate current for the testing circuit. In either case, direct current circuitry is employed with the inherent danger of subjecting the device to be tested to excessive current values thereby resulting in inadvertent detonation thereof or otherwise causing damage thereto. Other disadvantages possessed by existing ohmmeters involve intricacy of operation and design, low sensitivity and accuracy, and poor reliability. While one embodiment of the present invention does utilize photocells, its principle of operation is centered about an alternating current circuit including a completely isolated test circuit.

It is the object, therefore, of the present invention to provide an ohmmeter that employs a testing circuit in electrical isolation from the power source to render the instrument as safe as possible for testing sensitive devices. It is also the purpose of the present invention to provide a resistance measuring instrument that is simple and easy to operate, and one that is reliable and responsive to extremely low resistances as well as to values in the megohm range. A further object of this invention is the provision of additional means for checking circuits for a no voltage condition before delicate and sensitive elements are inserted therein. These and other objects and advantages of the present invention will be readily appreciated as the same becomes understood by reference to the following detailed description, when considered in connection with the accompanying drawings.

Briefly, the present invention comprises a direct current source, a free-running multi-vibrator, and novel means for producing a low energy alternating current source therefrom, this means including an arrangement in which a portion of the circuit is physically and electrically isolated from the direct current source by employment of photocells or transducers. Coupled to this isolated portion is the primary winding of a transformer, the secondary winding being the actual test circuit. Because the two windings of the transformer are linked only inductively with no actual connection therebetween, the test circuit is further electrically isolated from the power source. When a device is to be tested by the present invention, it is coupled to the test leads and consequently to the secondary winding of the transformer. The load resistance of the device causes a change in the secondary loading which is reflected back into the primary winding and indicated by a change in voltage drop thereacross. This change is indicated on a voltmeter connected across the primary having an additional scale thereon calibrated in ohms.

Figure 2:
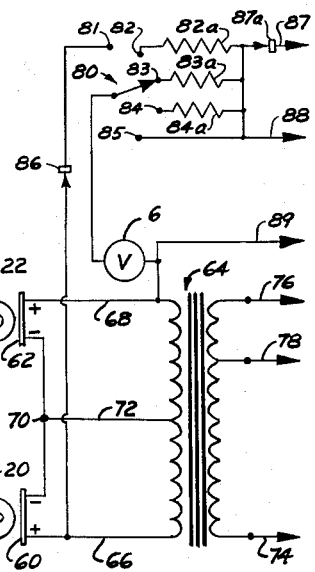
Figure 2:
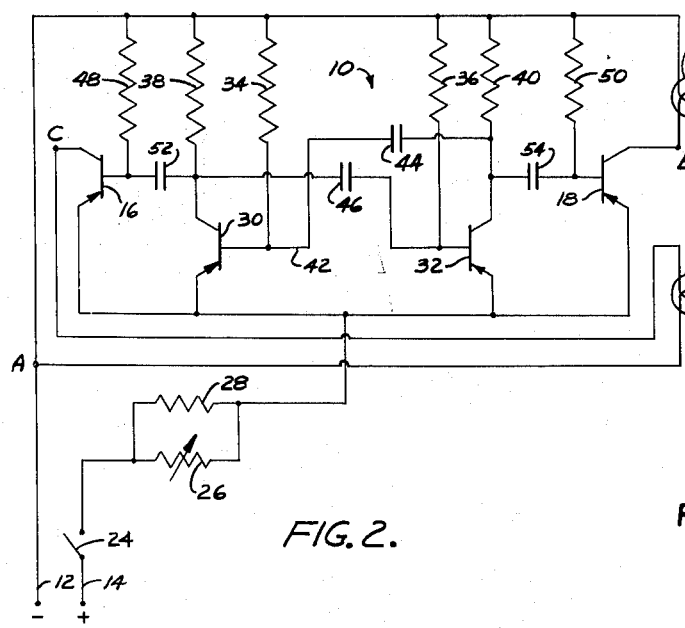

In the drawings:
FIG. 1 is a perspective of the present invention illustrating its compactness and presenting its external general arrangement;
FIG. 2 is a schematic diagram of a transistorized circuit of one embodiment of the present invention;
FIG. 3 is a schematic diagram of a tube circuit of the embodiment of FIG. 2;
FIG. 4 represents still another embodiment of the present invention; and
FIG. 5 is a diagrammatic representation of a modification of the embodiment of FIG. 4.

Referring now to the drawings in detail, FIG. 1 shows an ohmmeter 1 constituting the present invention and having a housing 2 with connectors 3, 3a, 4, 4a and 4b secured thereon. A window 5 is provided on the face of the housing to permit viewing of a voltmeter 6 which is provided with an additional scale calibrated in ohms. Provided also on the housing 2 is an on-off knob 7, a zero-adjust dial 8, and a selector switch knob 9.

In FIG. 2 is seen a schematic of one embodiment of the circuitry associated with the present invention in which a transistorized free-running multi-vibrator 10 is connected to direct current supply lines 12 and 14. Coming off each side of the multi-vibrator are amplifiers 16 and 18, respectively, which are coupled to miniature incandescent lamps 20 and 22, respectively.

In the line 14 is a switch 24 and a zero-adjust rheostat 26, the latter being shunted by a resistor 28. Leading from the rheostat in parallel relationship are the emitters of a pair of transistors 30 and 32 of the multi-vibrator 10. These transistors are comparable to those of the General Electric Company bearing number 2N188A. The base of the transistor 30 is connected through a resistor 34 to the line 12, the base of the transistor 32 being connected through a resistor 36 to the line 12. The collector of each of the transistors 30 and 32 is coupled to the line 12 through resistors 38 and 40, respectively. Connecting the base of the transistor 30 to the collector of the transistor 32 is a lead 42 having a capacitor 44 therein, the base of the transistor 32, in similar manner, being connected through a capacitor 46 to the collector of transistor 30.

Also coming off the rheostat 26 in parallel manner are the emitters of the amplifier transistors 16 and 18 which are also comparable to General Electric Company's number 2N188A. The base of each of the transistors 16 and 18 is connected to the line 12 through resistors 48 and 50, respectively. Interposed between the base of the transistor 16 and the collector of the transistor 30 is a capacitor 52. In like manner, a capacitor 54 is connected between the base of the transistor 18 and the collector of the transistor 32.

Energization of the lamp 20 is made through connection of one side thereof to the collector of the transistor 16, the other side of the lamp leading to the line 12. Similarly, lamp 22 is energized by connection to the collector of the transistor 18 and line 12.

Thus the free-running multi-vibrator 10, through amplifiers 16 and 18, alternately lights the lamps 20 and 22 in rapid cycle. Sensing this alternation are photocells 60 and 62 which are coupled to the primary winding of a transformer 64. As can be seen in FIG. 2, leads 66 and 68 connect the positive terminals of the photocells 60 and 62 to the ends of the primary winding. The negative terminals of the photocells are joined at a common point 70 from which a lead 72 is connected to the center tap of the primary of the transformer. Connected to the ends of the secondary coil of the transformer 64 are test leads 74 and 76 which are to be coupled with the device to be tested. A third test lead 78 may be connected at some intermediate point on the secondary to provide a different scale deflection.

Shunting the primary coil and connected to the leads 66 and 68 is a voltage drop indicating circuit including the voltmeter 6. Leading from the voltmeter is the switch arm of a selector switch 80 which is engageable with a plurality of contacts 81, 82, 83, 84 and 85. Contact 81 is connected to the line 66 through an instrument rectifier 86, while resistors 82a, 83a and 84a are connected to the contacts 82, 83 and 84, respectively. These resistors and the contact 85 are tied in together and coupled to a pair of voltage test leads 87 and 88, a second instrument rectifier 87a being connected in series with the lead 87. Coming off the other side of the voltmeter 6 and connected to the lead 68 is a third test lead 89.

In operation, closure of the switch 24 allows the multi-vibrator 10 to cause alternate energization of the lamps 20 and 22. The sensing of this alternation by the photocells 60 and 62 sets up an alternating current that is fed to the primary winding of the transformer 64. If the switch arm of the switch 80 is engaged with the contact 81, and a load whose resistance is to be measured is placed across the test leads 74 and 76, the resulting change in secondary coil loading will be reflected back into the primary winding and indicated by a change in voltage drop thereacross. This latter change is indicated on the voltmeter 6 which, because it is provided with a scale calibrated in ohms, renders a direct indication of the value of the load resistance.

A voltage check, or as it is sometimes called, a no voltage check feature is also embodied in the present invention and includes the switch 80 and the test leads 87, 88 and 89 in conjunction with the voltmeter 6. With the switch arm in position 82, 83, 84 or 85, by using the test leads 88 and 89, a multi-range direct current voltmeter is provided. When the test lead 87 is used in conjunction with the lead 89, the instrument rectifier 87a is placed into the circuit to form a multi-range alternating current voltmeter having a range as provided by the various switch positions.

In FIG. 3 is seen a schematic of an alternate circuit for producing the cyclic lighting of the lamps 20 and 22. A free-running multi-vibrator network 90 including triodes 92 and 94 are coupled to a direct current power source through a zero-adjusting rheostat 96. Coming off the multivibrator 90 are amplifier triodes 98 and 100, the former feeding the lamp 20 and the latter being connected to the lamp 22. Closure of switch 102 thus causes alternate lighting of the lamps 20 and 22 which can be sensed by the same photocell and transformer arrangement as shown in FIG. 2.

FIG. 4 represents another embodiment of the present invention and shows means which replaces the lamps 20 and 22 and the photocells 60 and 62 and which, when coupled to the multi-vibrator and amplifier circuit of either FIG. 2 or 3, will produce an alternating current for energization of the transformer 64. In this embodiment, a pair of transducers, such as speakers or receivers 110 and 112 having a coil and a diaphragm therein, are mounted in spaced relationship on a plastic plate 114, each of the receivers facing into an aperture 116 extending through the plate. One end of the coil of the receiver 110 replaces the lamp connection at point C in FIG. 2, while one end of the coil for receiver 112 replaces the lamp connection at point B in FIG. 2. The other coil ends are joined at a common point and connected to point A in FIG. 2, replacing a third lamp connection.

Mounted on the other side of the plastic plate 114 and opposing the receivers 110 and 112 through apertures 116 are receivers 118 and 120, respectively. All the receivers are mounted on the plate 114 in sealed relationship to form an air column in the aperture 116 between opposing pairs of receivers. The coils of the receivers 118 and 120 are coupled to the transformer 64 in a fashion similar to that of the photocells 60 and 62 in the embodiment of FIG. 2. That is, one end of each of the receiver coils is connected to the respective ends of the primary winding, the other end of the receiver coils being tied together and joined to the center tap of the primary.

In this manner, alternate energization of the receivers 110 and 112 cause their respective diaphragms to move in accordance with the signal received, thereby setting up pressure variations in the air columns. These pressure variations are sensed by the diaphragms of the receivers 118 and 120 and caused to move correspondingly therewith, thus changing the reluctance of the magnetic circuits in these receivers. This reluctance change induces a current to flow in each of the coils of the receivers 118 and 120, and because the receivers are alternately energized, an alternating current is caused to flow in the primary winding of the transformer 64. The voltage check and test lead circuitry of the embodiment of FIG. 2 is also used in conjunction with this transducer arrangement to provide again a versatile resistance and voltage indicating instrument.

A modification of the embodiment of FIG. 4 is shown in FIG. 5 and entails the replacement of the air column in the apertures 116 by a non-conductive mechanical linkage such as a rod 122 secured to each of the diaphragms of the opposing pairs of receivers 110, 118 and 112, 120. With this arrangement there is possible a more positive transmission of the motion of one diaphragm to the other. Also, the replacement of the air column eliminates any sealing problems attendant therein.

Referring again to FIG. 1 and 2, it is to be understood that the resistance test leads 74 and 76 are connected to the connector 3 which is of the coaxial type, while test leads 76 and 78 are coupled to the connector 3a which is also a coaxial connector. The voltage test leads 87, 88, and 89 are coupled to the connectors 4, 4a, and 4b, respectively. The on-off knob 7 controls the switch 24 and the dial 8 is tied into the zero-adjust rheostat 26, the knob 9 being coupled to the selector switch 80.

The present invention, using an alternating current in the test circuit and being calibrated in pure resistance, measures the effective resistance of a circuit. Where reactance is involved, this invention does, in fact, measure impedance directly in ohms. Therefore an added feature of the present invention is the provision of a meter which will give a direct indication in ohms of a load involving resistance and reactance.

Obviously many modifications and variations of the present invention are possible in the light of the above teachings. It is therefore to be understood that within the scope of the appended claims, the invention may be practiced otherwise than as specifically described.

What is claimed is:

1. An electrical resistance measuring apparatus providing an energy output of such low level as to permit the checking of hazardous or sensitive circuits, comprising, a source of direct current electrical energy, a free-running multi-vibrator network coupled thereto, a pair of amplifiers connected to said multi-vibrator network and being alternately energized thereby, a lamp connected to each of said amplifiers and being alternately lighted thereby, a photocell for each of said lamps and positioned in close proximity thereto for sensing the alternate lighting thereof, said photocells being energized only by the light from said lamps, a transformer having a primary and a secondary winding, said photocells being coupled to said primary winding and inducing an alternating current to flow therein, said alternating current inducing an output in said secondary winding, a voltmeter shunting said primary winding, and a pair of test leads connected to said secondary winding, whereby electrical resistance measuring means is provided wherein said output is of such low level as to permit the checking of hazardous or sensitive circuits without detonation or injury thereof, and whereby a load resistance connected across said test leads causes a change in loading across said secondary winding which is reflected back into said primary winding and indicated on said voltmeter as a change in voltage drop thereacross, said voltmeter being calibrated in ohms to provide a value of the load resistance across said test leads.

2. The apparatus as recited in claim 1 with additionally a voltage check circuit including a selector switch coupled to one side of said voltmeter, a plurality of resistors coupled to said switch, a pair of voltage test leads connected to said resistors, and a third test lead coupled to the other side of said voltmeter.

3. An electrical resistance measuring apparatus providing an energy output of such low level as to permit the checking of hazardous or sensitive circuits, comprising, a source of direct current electrical energy, a free-running multi-vibrator network coupled thereto, a pair of amplifiers connected to said multi-vibrator network, each of said amplifiers being alternately energized thereby, a pair of transducers coupled to said amplifiers, a second pair of transducers positioned in spaced relationship to said first pair and in electrical isolation therefrom, said second pair of transducers being responsive only to energy from said first pair of transducers, a transformer having a primary and a secondary winding, said second pair of transducers being coupled to said primary winding and inducing an alternating current to flow therein, said alternating current inducing an output in said secondary winding, voltage drop indicating means shunting said primary winding, and a pair of test leads connected to said secondary winding, whereby electrical resistance measuring means is provided wherein said output is of such low level as to permit the checking of hazardous and sensitive circuits without detonation or injury thereof, and whereby a load resistance connected across said test leads causes a change in loading across said secondary winding which is reflected back into said primary winding and registered on said voltage drop indicating means as an indication of the value of the load resistance across said test leads.

4. The apparatus as recited in claim 3 with additionally a voltage check circuit including a selector switch coupled to one side of said voltage drop indicating means, a plurality of resistors coupled to said switch, a pair of voltage test leads connected to said resistors, and a third test lead coupled to the other side of said voltage drop indicating means.

5. An electrical resistance measuring device having an energy output of such a low level as to permit the checking of hazardous and sensitive circuits, comprising, alternating current generating means including a multi-vibrator, a pair of energy radiating sources coupled to said multi-vibrator, each of said sources being alternately energized thereby, energy conversion means for each of said sources for receiving the energy radiated therefrom, said means being in electrical isolation from said sources and being energized only by said sources, a transformer having a primary and a secondary winding, said energy conversion means being coupled to said primary winding and inducing an alternating current to flow therein, said alternating current inducing an output in said secondary winding, voltage drop indicating means coupled to said primary winding, and test leads coupled to said secondary winding, whereby electrical resistance measuring means is provided wherein said output is of such low level as to permit the checking of hazardous and sensitive circuits without detonation or injury thereof, and whereby a load resistance connected across said test leads causes a change in loading across said secondary winding, said change being reflected back into said primary winding and registered on said voltage drop indicating means as an indication of the value of the load resistance across said test leads.

6. The invention recited in claim 5 with additionally a voltage check circuit coupled to said voltage drop indicating means and including a plurality of voltage test leads.

7. An electrical resistance measuring device having an energy output of such low level as to permit the checking of hazardous or sensitive circuits, comprising, alternating current generating means including a multi-vibrator, a pair of transducers connected to said multi-vibrator, each of said transducers being alternately energized thereby, a second pair of transducers positioned in spaced relationship to said first pair and in electrical isolation therefrom, said second pair of transducers being responsive only to energy from said first pair of transducers, a transformer having a primary and a secondary winding, said second pair of transducers being coupled to said primary winding and inducing an alternating current to flow therein, said alternating current inducing an output in said secondary winding, voltage drop indicating means coupled to said primary winding, and test leads coupled to said secondary winding, whereby electrical resistance measuring means is provided wherein said output is of such low level as to permit the checking of hazardous and sensitive circuits without detonation or injury thereof, and whereby a load resistance connected across said test leads causes a change in loading across said secondary winding, said change in loading being reflected back into said primary winding and registered on said voltage indicating means as an indication of the value of the load resistance across said test leads.

8. The apparatus as recited in claim 7 with additionally insulating structure between said first and second pairs of transducers and having a pair of air columns therein for communicating said first pair of transducers with said second pair.

9. The apparatus as recited in claim 7 with additionally a non-conductive rod for coupling each of said first pair of transducers with each of said second pair.

10. An electrical impedance measuring device, comprising, alternating current generating means including a multi-vibrator, a pair of transducers connected to said multi-vibrator, each of said transducers being alternately energized thereby, a second pair of transducers positioned in spaced relationship to said first pair and in electrical isolation therefrom, said second pair of transducers being responsive only to said first pair of transducers, a transformer having a primary and a secondary winding, said second pair of transducers being coupled to said primary winding and inducing an alternating current to flow therein, said alternating current inducing an output in said secondary winding, voltage drop indicating means coupled to said primary winding, and test leads coupled to said secondary winding whereby electrical impedance measuring means is provided wherein said output is of such low level as to permit the checking of hazardous or sensitive circuits without detonation or injury thereof, and whereby an impedance load connected across said test leads causes a change in loading across said secondary winding which is reflected back into said primary winding and indicated on said voltmeter as a change in voltage drop thereacross, said voltmeter being calibrated in ohms to provide a value of the impedance load across said test loads.

11. The apparatus as recited in claim 10 with additionally means for mechanically coupling each of said first pair of transducers with each of said second pair.

References Cited in the file of this patent

UNITED STATES PATENTS

| | | |
|---|---|---|
| 706,798 | Chapman | Aug. 12, 1902 |
| 1,645,077 | Thompson | Oct. 11, 1927 |
| 2,176,442 | Wise | Oct. 17, 1939 |
| 2,815,487 | Kaufman | June 11, 1953 |
| 2,882,494 | Webster | Apr. 14, 1959 |
| 2,916,703 | Stidger | Dec. 8, 1959 |
| 2,942,183 | Chance | June 21, 1960 |